(12) United States Patent
Hermenier et al.

(10) Patent No.: US 12,705,080 B2
(45) Date of Patent: Aug. 11, 2026

(54) LOAD BALANCING VIRTUAL COMPUTING INSTANCES ASSOCIATED WITH VIRTUAL GRAPHICS PROCESSING UNITS

(71) Applicant: NUTANIX, INC., San Jose, CA (US)

(72) Inventors: Fabien Hermenier, Grasse (FR); Karan Talreja, Santa Clara, CA (US); Aditya Ramesh, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 580 days.

(21) Appl. No.: 17/381,543

(22) Filed: Jul. 21, 2021

(65) Prior Publication Data

US 2022/0318044 A1 Oct. 6, 2022

Related U.S. Application Data

(60) Provisional application No. 63/169,105, filed on Mar. 31, 2021.

(51) Int. Cl.
*G06F 9/455* (2018.01)
*G06T 1/20* (2006.01)

(52) U.S. Cl.
CPC ............ *G06F 9/45558* (2013.01); *G06T 1/20* (2013.01); *G06F 2009/4557* (2013.01)

(58) Field of Classification Search
None
See application file for complete search history.

(56) References Cited

U.S. PATENT DOCUMENTS 8,549,518 B1 10/2013 Aron et al.
8,601,473 B1 12/2013 Aron et al.
8,850,130 B1 9/2014 Aron et al.
8,863,124 B1 10/2014 Aron
9,009,106 B1 4/2015 Aron et al.
(Continued)

FOREIGN PATENT DOCUMENTS

CN 110569225 A * 12/2019 .......... G06F 16/188

OTHER PUBLICATIONS

Wang et al.; "Virtual Machine Migration Planning in Software-Defined Networks"; Oct.-Dec. 2019; IEEE Transactions on Cloud Computing; vol. 7, No. 4; pp. 1168-1182. (Year: 2019).*
(Continued)

*Primary Examiner* — Umut Onat
(74) *Attorney, Agent, or Firm* — Artegis Law Group, LLP

(57) ABSTRACT

Various embodiments set forth one or more non-transitory computer-readable media storing program instructions that, when executed by one or more processors, cause the one or more processors to perform steps of determining at least one physical resource of a node in a cluster of nodes is under contention by virtual computing instances or a virtual computing instance cannot be placed on the cluster of nodes, determining a placement for one or more virtual computing instances on the cluster of nodes, each virtual computing instance having a virtual resource associated with a profile that is compatible with a profile associated with a physical resource of a node on which the virtual computing instance is placed, and generating and executing a plan to achieve the placement, the plan including at least one of migrating at least one virtual computing instance or reconfiguring a profile associated with at least one physical resource.

38 Claims, 9 Drawing Sheets

(56) References Cited

U.S. PATENT DOCUMENTS 9,069,708 B2 6/2015 Gill et al.
9,336,132 B1 5/2016 Aron et al.
9,652,265 B1 5/2017 Narayanasamy et al.
9,747,287 B1 8/2017 Bhardwaj et al.
9,772,866 B1 9/2017 Aron et al.
9,904,974 B2 2/2018 Wilt et al.
11,657,069 B1 * 5/2023 Narayanaswamy ... G06N 20/20 707/602
2013/0125112 A1 * 5/2013 Mittal ................ G06F 9/45558 718/1
2013/0212578 A1 * 8/2013 Garg .................... H04L 47/122 718/1
2015/0106811 A1 * 4/2015 Holler ................ G06F 9/45533 718/1
2016/0055024 A1 * 2/2016 Apte ........................ G06F 8/60 718/1
2016/0308783 A1 * 10/2016 Bookman .......... G06F 9/45558
2016/0378524 A1 * 12/2016 Gough ............... G06F 9/45558 718/1
2017/0068555 A1 * 3/2017 Cropper ............. G06F 9/45558
2017/0093898 A1 * 3/2017 Keohane .............. G06F 16/958
2017/0116025 A1 * 4/2017 Ghosh ................ G06F 9/45558
2018/0060996 A1 * 3/2018 Tunuguntla ......... G06F 9/45558
2018/0139100 A1 * 5/2018 Nagpal ................ H04L 41/122
2019/0102212 A1 4/2019 Bhandari et al.
2019/0220313 A1 * 7/2019 Singh ................... G06F 9/5094
2019/0272614 A1 * 9/2019 Prakash ................... G06T 1/20
2021/0011751 A1 1/2021 Garg et al.
2021/0150659 A1 * 5/2021 Guerra .................. G09G 5/363
2021/0303327 A1 * 9/2021 Vu ..................... G06F 9/45558
2022/0150898 A1 * 5/2022 Jin ......................... G06F 9/455
2022/0236899 A1 * 7/2022 Toyonaga ............ G06F 3/0679

OTHER PUBLICATIONS

Lin; English translation corresponding to CN 110569225 A; Dec. 13, 2019 (Year: 2019).*

Beloglazov et al.; "Optimal online deterministic algorithms and adaptive heuristics for energy and performance efficient dynamic consolidation of virtual machines in Cloud data centers"; Oct. 2011; Concurrency Computat.: Pract. Exper. 2012; 24:1397-1420. (Year: 2011).*

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

"vGPU enabled Instant clone desktops are not load balanced correctly (57297)", https://kb.vmware.com/s/article/57297?lang=en_US, 4 pages, accessed Dec. 14, 2021.

Garg et al., "Virtual Machine Placement solution for vGPU enabled Clouds", https://sci-hub.se/https://ieeexplore.ieee.org/document/9188069, 7 pages, accessed May 7, 2021.

Nvidia, "Virtual GPU software Documentation", https://docs.nvidia.com/grid/5.0/grid-vgpu-user-guide/index.html, 118 pages, accessed May 7, 2021.

Slavashi et al., "GPUCloudSim: an extension of CloudSim for modeling and simulation of GPUs in cloud data centers", https://www.researchgate.net/publication/328317992_GPUCloudSim_an_extension_of_CloudSim_for_modeling_and_simulation_of_GPUs_in_cloud _data_centers, 32 pages, accessed May 7, 2021.

* cited by examiner

LOAD BALANCING VIRTUAL COMPUTING INSTANCES ASSOCIATED WITH VIRTUAL GRAPHICS PROCESSING UNITS

CROSS-REFERENCE TO RELATED APPLICATIONS

This application claims priority benefit of the U.S. Provisional Patent Application titled, "LOAD BALANCING VIRTUAL COMPUTING INSTANCES ASSOCIATED WITH VIRTUAL GRAPHICS PROCESSING UNITS," filed on Mar. 31, 2021, and having Ser. No. 63/169,105. The subject matter of this related application is hereby incorporated herein by reference.

TECHNICAL FIELD

The contemplated embodiments relate generally to management of resources in a computing system and, more specifically, to load balancing virtual computing instances associated with virtual graphics processing units.

BACKGROUND

A virtual machine (VM) is a virtualization of a computing system. A VM can implement a virtual hardware platform that supports the installation of a guest operating system (OS) on which applications execute.

The physical hardware on which a VM executes is referred to as a host computer, or a "node." Oftentimes, VMs are placed across multiple nodes in a "cluster" of nodes. Each node can execute multiple VMs that share physical resources of the node. One node resource that can be shared by VMs is a graphics processing unit (GPU). Virtual GPUs (vGPUs) are abstractions of GPUs that permit VMs to use physical GPU (pGPU) resources. Conventionally, each vGPU of a VM is assigned to a pGPU of a node having a profile that is compatible with a profile of the vGPU and having sufficient free capacity, or to a pGPU that has not been assigned any other vGPUs. The profile of each vGPU and each pGPU can include a level of performance, amount of memory, hosting capacity, and/or other property associated with the vGPU and/or pGPU.

One approach for placing VMs having vGPUs (also referred to herein as "vGPU VMs") onto nodes applies a breadth-first search technique in which each vGPU is assigned to a least-used pGPU having a profile that is compatible with a profile of the vGPU. Doing so attempts to maximize performance by spreading VMs across the nodes of a cluster. Another approach for placing vGPU VMs onto nodes applies a depth-first search technique in which each vGPU is assigned to a most-used pGPU having a profile that is compatible with a profile of the vGPU. Doing so attempts to minimize the number of pGPUs that are being used to support vGPUs of VMs. Conventionally, breadth-first search and depth-first search techniques are applied to place each vGPU VM when the vGPU VM is first powered on, which is referred to herein as a "static placement" of the vGPU VM.

One drawback to the breadth-first search approach for placing vGPU VMs onto nodes is that VMs having vGPUs with different profiles may be placed onto different nodes having pGPUs whose profiles are compatible with the vGPU profiles. In such cases, resources of the nodes may become fragmented, and the pGPUs may be underutilized, when relatively few vGPUs are assigned to each pGPU.

One drawback to the depth-first search approach for placing vGPU VMs onto nodes is that multiple vGPU VMs may be placed onto a single node if the vGPUs of those VMs are assigned to the same pGPU of the node. In such cases, the node can become a "hot spot" where resources such as the pGPU, a central processing unit (CPU), or memory, are under contention by the multiple vGPU VMs. Hot spots can also be created by the breadth-first search approach for placing vGPU VMs when multiple vGPU VMs are placed on the same node having a pGPU whose profile supports the vGPU profiles associated with those vGPU VMs.

Accordingly, there is a need for improved techniques for assigning vGPUs to pGPUs.

SUMMARY

In various embodiments, one or more non-transitory computer-readable media storing program instructions that, when executed by one or more processors, cause the one or more processors to perform steps of determining at least one physical resource of a node in a cluster of nodes is under contention by virtual computing instances or a new virtual computing instance cannot be placed on any node in the cluster of nodes, determining a placement for one or more virtual computing instances on the cluster of nodes, each virtual computing instance having a virtual resource associated with a profile that is compatible with a profile associated with a physical resource of a node on which the virtual computing instance is placed, and generating and executing a plan to achieve the placement, where the plan includes at least one of migrating at least one virtual computing instance or reconfiguring a profile associated with at least one physical resource.

Other embodiments include, without limitation, systems and methods that implement one or more aspects of the disclosed techniques.

At least one technical advantage of the disclosed techniques relative to the prior art is that the disclosed techniques can improve hosting capacity by defragmenting a cluster of nodes. The improved hosting capacity can include the ability to host a vGPU VM or other virtual computing instance associated with a different profile after vGPU VMs or virtual computing instances associated with one profile are consolidated on one or more pGPUs and another pGPU is freed to support the different profile. Another technical advantage of the disclosed techniques relative to the prior art is the disclosed techniques can enable better VM or other virtual computing instance performance by mitigating or eliminating hot spots where resources are under contention on a node. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
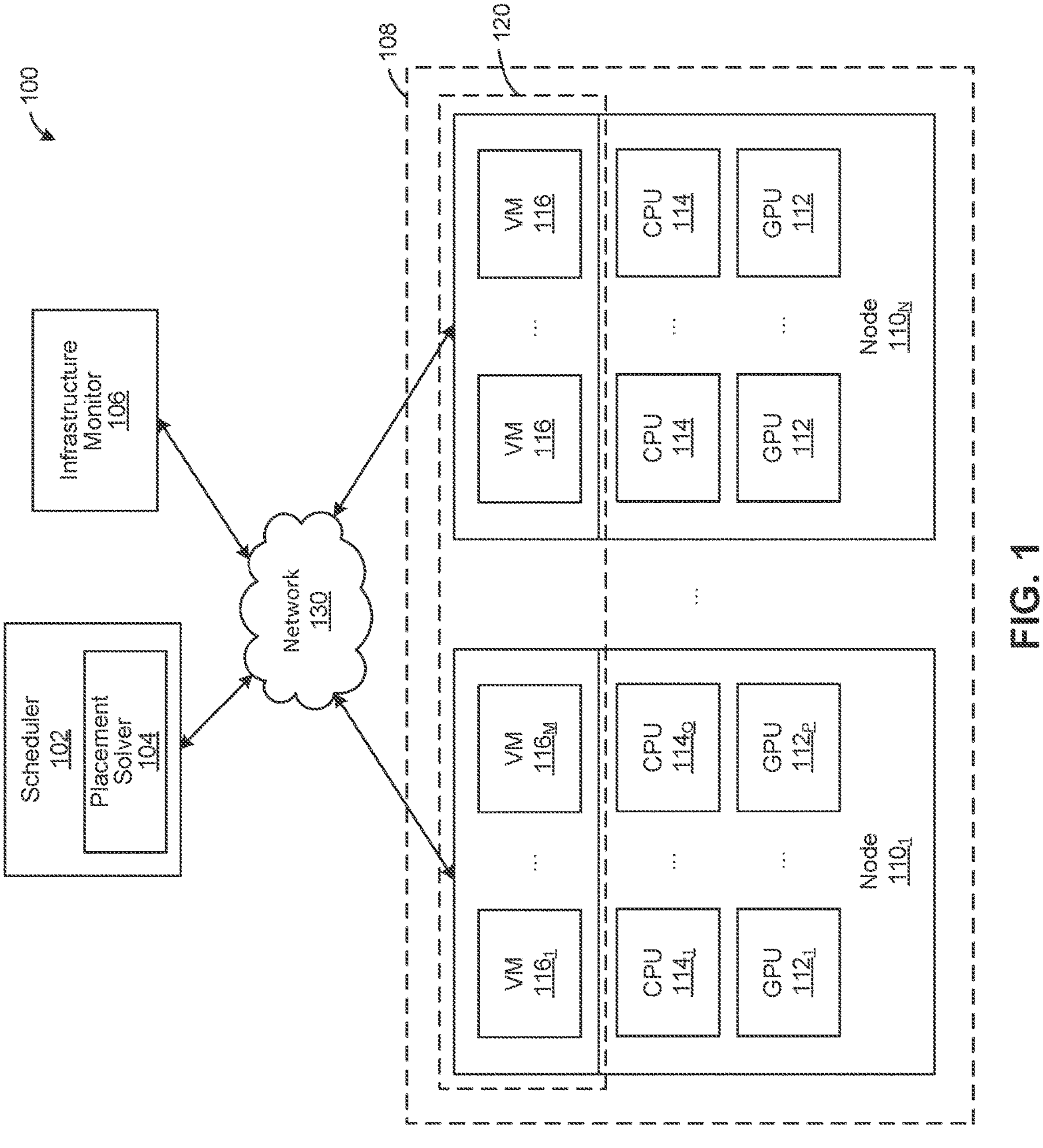
FIG. 1 is a conceptual illustration of a system that is configured to implement one or more aspect of the various embodiments.

FIG. 1 is a conceptual illustration of a system 100 that is configured to implement one or more aspect of the various embodiments. As shown, system 100 includes one or more nodes 110 (referred to herein individually as a node 110 and collectively as nodes 110) on which a virtualized infrastructure 120 is implemented. Each node 110 can include any technically feasible computing system, such as a server computing system. Illustratively, the hardware of each node 110 includes one or more CPUs 114 (referred to herein individually as a CPU 114 and collectively as CPUs 114) and one or more GPUs 112 (referred to herein individually as a GPU 112 and collectively as GPUs 112). In addition, the hardware of each node 110 can include system memory, a network interface, storage, and I/O devices such as a mouse and keyboard (not shown).

Virtualized infrastructure 120 is a software-based infrastructure that is hosted on physical hardware of nodes 110. In some embodiments, virtualized infrastructure 120 can be implemented in a cloud computing system, such as a computing system implementing a public cloud in which computing services are offered by a provider over the Internet to the public, a private cloud in which computing services are offered to select users, or a hybrid cloud that includes a combination of an on-premise data center that includes privately owned or controlled servers and a public cloud or a private cloud, and/or the like. In some embodiments, virtualized infrastructure 120 can provide one or more services via an infrastructure as a service (IaaS) delivery model. In some embodiments, virtualized infrastructure 120 can be a hyper-converged infrastructure that includes virtualized compute, storage, network and security, and management. One example of a hyper-converged infrastructure is the Acropolis™ infrastructure made commercially available from Nutanix, Inc. of San Jose, California. Illustratively, in virtualized infrastructure 120, virtualization is used to provision physical hardware resources of nodes 110, including CPU 114 and GPU 112 resources therein, across multiple VMs 116 (referred to herein individually as a VM 116 and collectively as VMs 116) that run on top of software interface layers (not shown), referred to herein as hypervisors, in nodes 110. Although VMs are described in further detail below as a reference example, techniques disclosed herein can also be applied to other types of virtual computing instances, such as containers, that provide isolated computing environments. Containers can be implemented via an abstraction layer that executes on top of the kernel of an operating system (OS) in a node (or a VM) and provides OS-level virtualization in which each container runs as an isolated process on the OS. Examples of containerization technologies include the Kubernetes® and Docker® platforms.

System 100 further includes an infrastructure monitor 106 and a scheduler 102 that communicate with nodes 110 via a network 130. Although shown as being distinct from nodes 110, infrastructure monitor 106 and scheduler 102 can be implemented in any technically feasible fashion, including as applications that run on nodes 110s and/or VMs 116. The infrastructure monitor 106 is responsible for collecting statistics that can include various metrics associated with cluster 108, nodes 110, VMs 116, hardware, etc. For example, in some embodiments, the metrics can include node capacities, VM locations and hardware resource usage such as CPU and pGPU usage, etc. The collected statistics can be used by scheduler 102 to place VMs on nodes, among other things.

Scheduler 102 acquires system information from infrastructure monitor 106 and uses the information to determine VM placements that satisfy one or more placement rules (also referred to herein as "placement constraints"). Each node 110 is characterized by a resource capacity, which can include an amount of CPU, GPU, memory, disk space, etc. the node has. Each VM 116 is characterized by a resource demand, which can include an amount of CPU, GPU, memory, disk space, etc. required by the VM 116. In some embodiments, the rules that a placement satisfies can include that, at any given moment, the cumulative resource usage of every VM running on a node does not exceed the resource capacity of that node, as well as (anti-)affinity constraints between VMs or between VMs and nodes that require particular VMs to be placed together (or apart) on particular nodes (or on separate nodes). Additional rules that are relevant for placing vGPU VMs are described in greater detail below in conjunction with FIG. 2. In addition to determining a viable placement, scheduler 102 can generate an associated reconfiguration plan that includes a schedule of actions to execute, such as VM migrations, to transition from a current placement to the determined placement. It should be noted that not every determined placement can be reachable from a current placement, and every reconfiguration plan has an associated cost reflecting the expense of transitioning from the current placement to the determined placement. The cost can account for the number of VMs that need to be migrated and the amount of memory to migrate, among other things. For every determined placement, scheduler 102 attempts to generate a reconfiguration plan that is associated with a lowest cost. After such a reconfiguration plan is generated, scheduler 102 applies the reconfiguration plan by following the plan to achieve the determined placement.

As described, when placing vGPU VMs in particular, each vGPU is assigned to a distinct pGPU of a node having a profile that is compatible with a profile of the vGPU and having sufficient free capacity, or to a "free" pGPU that has not been assigned any other vGPUs. When a pGPU is configured with a given profile that supports a given vGPU profile, which is also referred to herein as a "compatible" vGPU profile, multiple VMs can share the pGPU provided that vGPUs of those VMs have been assigned with the compatible profile. The profile of each vGPU and each pGPU can include a level of performance, an amount of memory, a hosting capacity, and/or any other suitable property associated with the vGPU and/or pGPU. Each profile of a pGPU can be associated with a capacity defining how many vGPUs having a compatible profile can be assigned to the pGPU, and a pGPU can be configured with different profiles depending upon the desired workload. The capacity is due to the fact that, unlike the GPU cores, encoders, and decoders of a pGPU that can be time shared across vGPUs, the framebuffer memory of a pGPU is typically partitioned for use by different vGPUs having compatible profiles. Different profiles that a pGPU can support can require different amounts of framebuffer memory that are different fractions (e.g., 1, ½, ¼, etc.) of the total framebuffer memory of the pGPU, so the capacity of a pGPU can depend on the vGPU profile (i.e., the compatible profile) that the pGPU is configured to support. For example, assume a pGPU has a framebuffer memory of 1024 MB. In such a case, one profile of the pGPU could support two VMs having vGPUs with compatible profiles and allocate a framebuffer memory size of 512 MB each to the two VMs, while another profile could support eight VMs having vGPUs with compatible profiles and allocate a framebuffer memory size of 128 MB each to the eight VMs. Typically, after a pGPU has been configured with a given profile, that pGPU can no longer be used to support vGPUs having another profile that is not compatible with the given profile, unless the pGPU is reconfigured with a different profile.

As described, one conventional approach for placing vGPU VMs onto nodes applies a breadth-first search technique in which each vGPU is assigned to a least-used pGPU having a profile that is compatible with a profile of the vGPU. Another conventional approach for placing vGPU VMs onto nodes applies a depth-first search technique in which each vGPU is assigned to a most-used pGPU having a profile that is compatible with a profile of the vGPU. Typically, breadth-first search and depth-first search techniques are applied to statically place vGPU VMs when the vGPU VMs are first powered on.

One drawback to the breadth-first search approach for placing vGPU VMs onto nodes is that VMs having vGPUs with different profiles can be placed onto different nodes having pGPUs whose profiles are compatible with the vGPU profiles. In such cases, the resources of the nodes can become fragmented, and the pGPUs can be underutilized, when relatively few vGPUs are assigned to each pGPU. One drawback to the depth-first search approach for placing vGPU VMs onto nodes is that multiple vGPU VMs can be placed onto a single node if the vGPUs of those VMs are assigned to the same pGPU of the node. In such cases, the node can become a "hot spot" where resources such as the pGPU, a central processing unit (CPU), or memory, are under contention by the multiple vGPU VMs. Hot spots can also be created by the breadth-first search approach for placing vGPU VMs when multiple vGPU VMs are placed on the same node having a pGPU whose profile supports the vGPU profiles associated with those vGPU VMs.

Dynamic Load Balancing of vGPU VMs

To address the cluster fragmentation and hot spot issues caused by conventional approaches for placing vGPU VMs, dynamic scheduling is applied in some embodiments to determine and implement new placements for vGPU VMs on nodes in a cluster after those vGPU VMs have been placed statically. Dynamic scheduling can address cluster defragmentation by re-arranging the placement of vGPU VMs based on corresponding vGPU profiles to liberate resources and increase the hosting capacity on one or more nodes in a cluster. In addition, dynamic scheduling can address hot spots by re-arranging the placement of vGPU VMs to mitigate resource contention experienced by a node running multiple vGPU VMs that compete for resources of the node. Although examples are described herein with reference to vGPUs and pGPUs, the techniques discussed below can be also applied to other types of virtual resources that are supported by underlying physical resources. Although examples are described herein with reference to VMs, the techniques discussed below can also be applied to other types of virtual computing instances, such as containers, that are associated with virtual resources supported by physical resources.

Figure 2A:
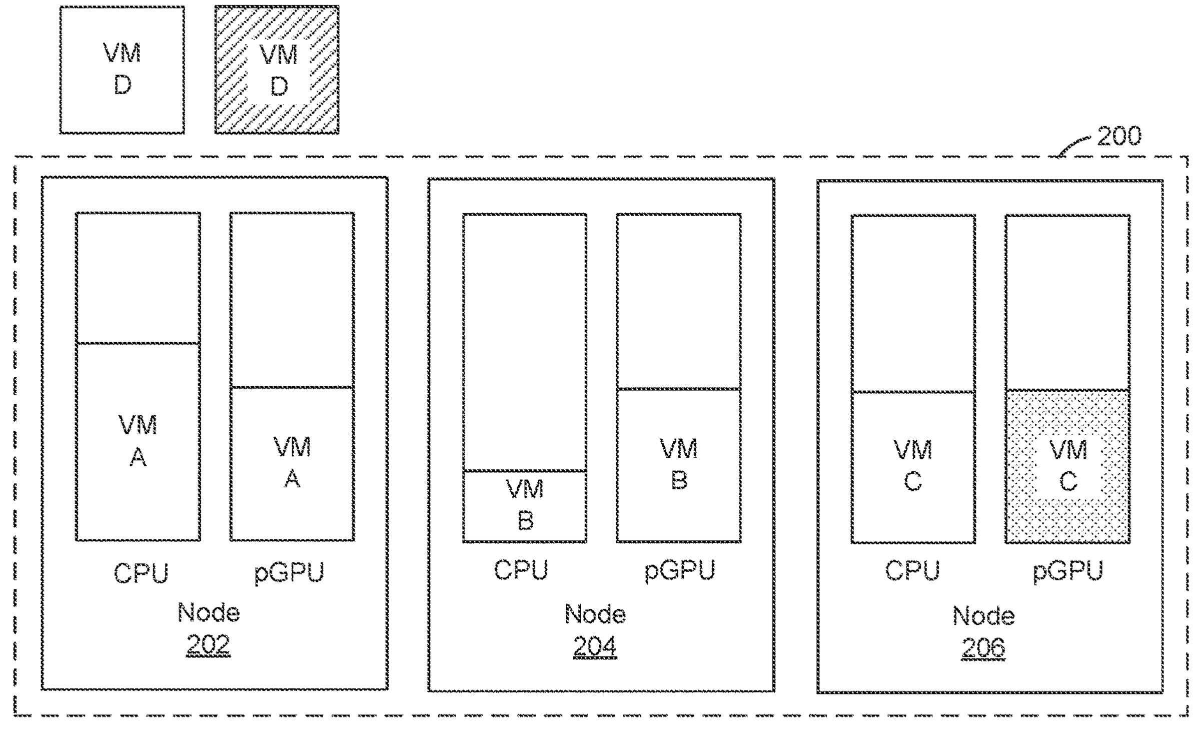
FIGS. 2A-2B illustrate an example cluster defragmentation to host a new vGPU VM, according to various embodiments.
Figure 2B:
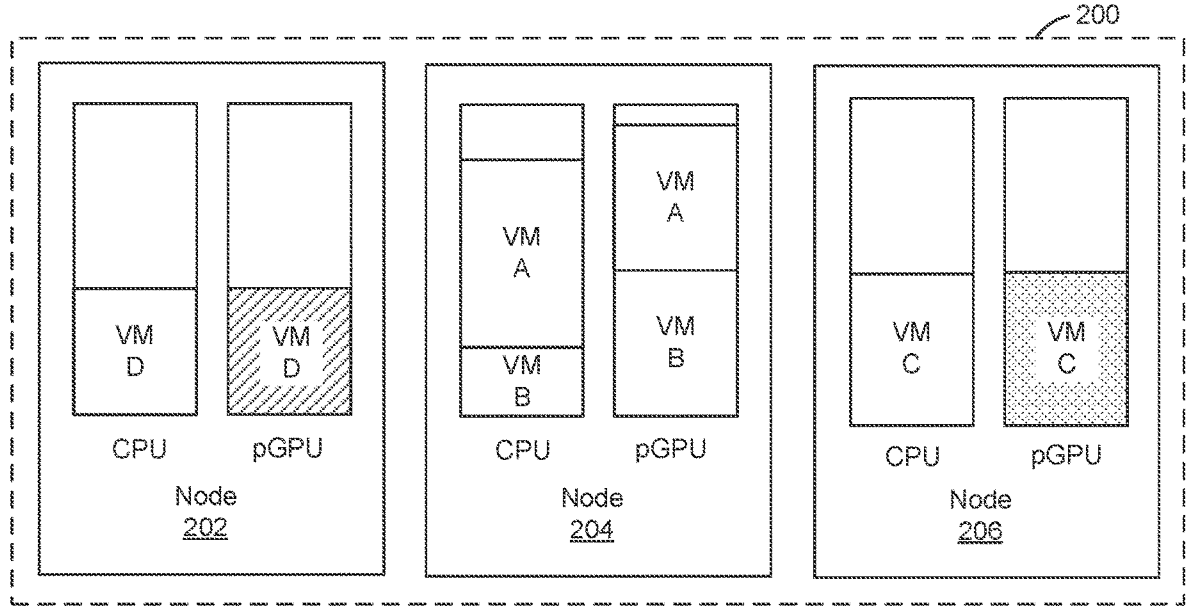

FIGS. 2A-2B illustrate an example cluster defragmentation to host a new vGPU VM, according to various embodiments. As described, the resources of nodes in a cluster may become fragmented, and pGPUs may be underutilized, when relatively few vGPUs are assigned to each pGPU in the cluster. As shown in FIG. 2A, a cluster 200 includes nodes 202, 204, and 206 that are running VMs A, B, and C, respectively. The placement of VMs A, B, and C on nodes 202, 204, and 206, respectively, can be made in any technically feasible manner, including statically via the breadth-first search and/or the depth-first search techniques described above in conjunction with FIG. 1, and/or as a result of previous dynamic scheduling. Also shown are the CPU and pGPU resources of nodes 202, 204, and 206 that are consumed by the VMs A, B, and C.

As shown, VMs A and B include vGPUs having a first profile type and VM C includes a vGPU having a second profile type, shown using different fill patterns. Illustratively, another VM D needs to be powered on in the cluster 200. VM includes a vGPU having a third profile type, shown using yet another fill pattern. As described, the profile of a vGPU or pGPU can include a level of performance, an amount of memory, a hosting capacity, and/or other property associated with the vGPU or pGPU, and each vGPU of a VM needs to be assigned to a distinct pGPU having a profile that is compatible with a profile of the vGPU and sufficient free capacity, or to a pGPU that has not been assigned any other vGPUs and can therefore be configured with a profile that is compatible with the profile of the vGPU.

As shown in FIG. 2B, one solution for placing VM D on cluster 200 is to place VM A on node 204, VM B on node 204, VM C on node 206, and VM D on node 202. Moving VM A from node 202 to node 204 frees up the pGPU of node 202. As a result, the pGPU of node 202 is no longer typed and can be reconfigured with a profile that is compatible with a profile of the vGPU of VM D. That is, cluster 200 is defragmented by consolidating some VMs (e.g., VMs A and B) on a node (e.g., node 204), so that one pGPU (e.g., the pGPU of node 202) is freed to be reconfigured with a profile that supports the vGPU profile of a new vGPU VM (e.g., VM D). In some embodiments, placement solver 104 is responsible for determining a placement, such as the placement shown in panel B, and generating a plan to achieve the placement. For example, the plan could include migrating (e.g., via a live migration) VM A from node 202 to node 204, reconfiguring the profile of the pGPU of node 202, and powering on VM D on node 202.

More generally, determining a placement can include assigning each vGPU of the VMs to be executed in a cluster to a pGPU. It should be noted that a pGPU is different from a CPU or memory on a node because, as described above, the capacity (i.e., the number of vGPUs that can be supported by the pGPU) of the pGPU depends on what vGPU profile the pGPU is configured to serve. For example, if the pGPU has a profile that supports four vGPUs of a first profile type, then only four vGPU VMs having one vGPU each of the first profile type (or fewer vGPUs having multiple vGPUs each of first profile type) can use the pGPU.

In some embodiments, placement solver 104 determines a placement subject to a capacity constraint that the number of vGPU VMs using a profile on a pGPU cannot exceed a capacity of the pGPU. In some embodiments, a placement is further determined subject to a homogeneity constraint that each pGPU only serves one type of vGPU profile. In some embodiments, a placement is further determined subject to a constraint that a vGPU VM having a vGPU that is assigned to a pGPU of a node cannot be migrated to another pGPU on the same node. The requirement that migration of a vGPU VM be from one node to another node is a result of how VM migration is typically implemented. In some embodiments, a placement is further determined subject to a constraint that each vGPU is assigned to a pGPU, which as described is a requirement for placements, and a constraint that different vGPUs associated with a vGPU VM are assigned to different pGPUs.

In some embodiments, placement solver 104 determines a placement using one or more heuristics. In such cases, placement solver 104 can use a branching heuristic that places harder to place VMs first. The hardest to place VMs can include VMs having more vGPUs, followed by VMs having vGPUs with greater size, and then followed by VMs having more virtual resources other than vGPUs. In addition, placement solver 104 can use a filtering heuristic that chooses a pGPU for each vGPU based on a cost. In some embodiments, the cost includes a framebuffer size of the pGPU that is in use after a placement and a number of VMs that need to migrate out of the node because of the placement.

More formally, the placement constraints can be expressed as rules in a mathematical model that can be implemented in a virtualized computing system. In some embodiments, the rules can be implemented using stand-alone heuristics, or as filters inside a filter-based scheduler (e.g., Openstack® nova or Kubernetes® scheduler). In other embodiments, the rules can be implemented via an exact solver based on mathematical programming. Constants and primitives defined in the model can be retrieved by an infrastructure monitoring system, such as infrastructure monitor 106. Let the model have the following primitives: N as the set of nodes in the cluster, V as the set of VMs in the cluster, P as the set of different profiles for GPUs, PGPU as the set of pGPUs, and VGPU as the set of vGPUs. Let the model also have the following placement-related variables and constants: hv(v) E N as the future placement of VM v, hg(i) ∈ PGPU as the future placement of vGPU i, p(j) ∈ P as the future profile for pGPU j, $hv_0(v) \in N$ as the initial node hosting VM v, $hg_0(i) \in N$ as the initial pGPU hosting vGPU i, and $p_0(j) \in P$ as the initial profile of pGPU j. In addition, let the model have the following constants: VP(i) ∈ P as the profile of vGPU i, PP(j) ∈ P as the possible profiles for pGPU j, VG (v) ∈ VGPU as the set of vGPUs attached to VM v, GV(i) ∈ V as the VM associated to vGPU i, PG(n) ∈ PGPU as the set of pGPUs on node n, GP(j) ∈ N as the node associated to pGPU j, and C(p) ∈ P is the hosting capacity associated with profile p. Given the foregoing primitives, variables, and constants, a placement is viable with regards to vGPU to pGPU assignment concerns if and only if the following rules are satisfied:

1. If a VM is placed on a node, its vGPUs are placed on pGPUs belonging to the node: $\forall_{v \in V} \forall_{i \in VG(v)} hv(v)=n \rightarrow hg(i) \in PG(n)$.
2. The vGPUs of a VM are always placed on distinct pGPUs: $\forall_{v e V} \forall_{i,j \in VG(v)|i \neq j} hg(i) \neq hg(j)$.
3. The vGPUs of different profiles cannot be co-located: $\forall_{i,j \star VGPU|i \neq j} VP(i) \neq VP(j) \rightarrow hg(i) \neq hg(j)$.
4. The number of vGPUs assigned to a pGPU must not exceed the capacity associated with the pGPU profile type: $\forall_{j \in PGPU} |\{i | i \in VGPU, hg(i)=j\}| \leq C(p(j))$.

In some embodiments, additional rules can be applied depending on the hardware and the virtualization architecture. For example, in the case of a virtualization that is provided by the QEMU virtual machine monitor, if a vGPU is re-assigned, it is assigned to a pGPU of another node: $\forall_{i \in VGPU} hg_0(i) \neq hg(i) \rightarrow hv(GV(i)) \neq hv_0(GV(i))$.

In addition to determining a placement, placement solver 104 generates a reconfiguration plan to achieve the determined placement, given the current placement of VMs on the cluster. The reconfiguration plan can include migrating one or more VMs and/or reconfiguring the profiles of one or more pGPUs to support different vGPU profiles. The migration(s) and/or reconfigurations of pGPU profile(s) will generally depend on what is required to achieve the determined placement. For example, if the determined placement includes assigning a vGPU having a particular profile to a pGPU having a profile that supports another vGPU profile, then the reconfiguration plan can include migrating VMs so that the pGPU is freed to be reconfigured to support the particular vGPU profile. In some embodiments, placement solver 104 identifies a plan that includes a minimum number of VM migrations, because each live migration of a VM can include a lengthy delay while the VM is paused via stunning. In addition, placement solver 104 determines an order for the migrations, because a pGPU can only serve one type of vGPU profile at a time and only up to a fixed number of VMs. In some embodiments, the ordering requires all incoming migrations to a node wait for a last outgoing migration from the node, after which a profile type of a pGPU can be changed to support a different vGPU profile. In some embodiments, the ordering further requires the capacity constraints of pGPUs to be satisfied continuously, including during live migrations when a VM uses resources at both nodes until the migration completes.

More formally, the reconfiguration planning can be expressed as rules in a mathematical model relating vGPU to pGPU assignment. The rules should ensure that a placement is reachable, and that the reconfiguration plan does not violate the vGPU to pGPU model, described above, which can involve controlling the timing of when migrations are started. Let the model have the following primitives: M as the set of migrations to perform; $m_v \in M$ as the migration associated with VM v, which is defined at the moment hv (v) ≠ $hv_0(v)$; T as the time; $st(m_v) \in T$ as the moment the migration of VM v starts; $ed(m_v) \in T$ as the moment the migration of VM v ends; and l(j, t) as the number of vGPUs running on pGPU j at time t. Given the foregoing primitives, the following rules can be checked to ensure that a determined placement is reachable:

1. If a vGPU is reassigned to a pGPU having an initially different profile, all vGPUs already on the pGPU must be migrated to other nodes beforehand: $\forall_{i \in VGPU} p(hg(i)) \neq p_0(hg(i)) \rightarrow \forall_{j \in VGPU | hg_0(j)=hg(i)} ed(m_{gv(j)}) \leq st(m_{gv(i)})$.

As the determined placement is viable, all of the vGPUs running on the pGPU will move away. Furthermore, as the pGPU is emptied before any vGPU arrives, any migration to the node can start immediately assuming other placement requirements are satisfied.

2. For a pGPU not being reassigned to another profile, the number of vGPUs being hosted by the pGPU cannot exceed the defined capacity of the pGPU. Let $S_j$ be the number of vGPUs staying on the pGPU. Then $S(j)=|\{i|i \in VGPU, hg(i)=hg_0(i)=j\}|$. Let A(j, t) be the number of vGPUs that have already arrived at time t (i.e., the migration of the associated VMs terminated). Then $A(j, t)=|\{i|i \in VGPU, hg(i)=j, hg_0(i) \neq j, start(m_{GV(i)}) \leq t\}|$. Let L(j, t) be the number of vGPUs that will have left the pGPU after being still on the pGPU at time t (i.e., the migration did not start). Then $L(j, t)=|\{i|i \in VGPU, hg(i) \neq j, hg_0(i)=j, st(m_{GV(i)}) \geq t\}|$. The load is then defined as follows: $\forall_{j \in PGPU} \forall_{t \in T} l(j, t)=S(j)+A(j, t)+L(j, t)$, $\forall_{j \in PGPU} \forall_{t \in t} l(j, t) \leq C(p_0(j))$.

Figure 3A:
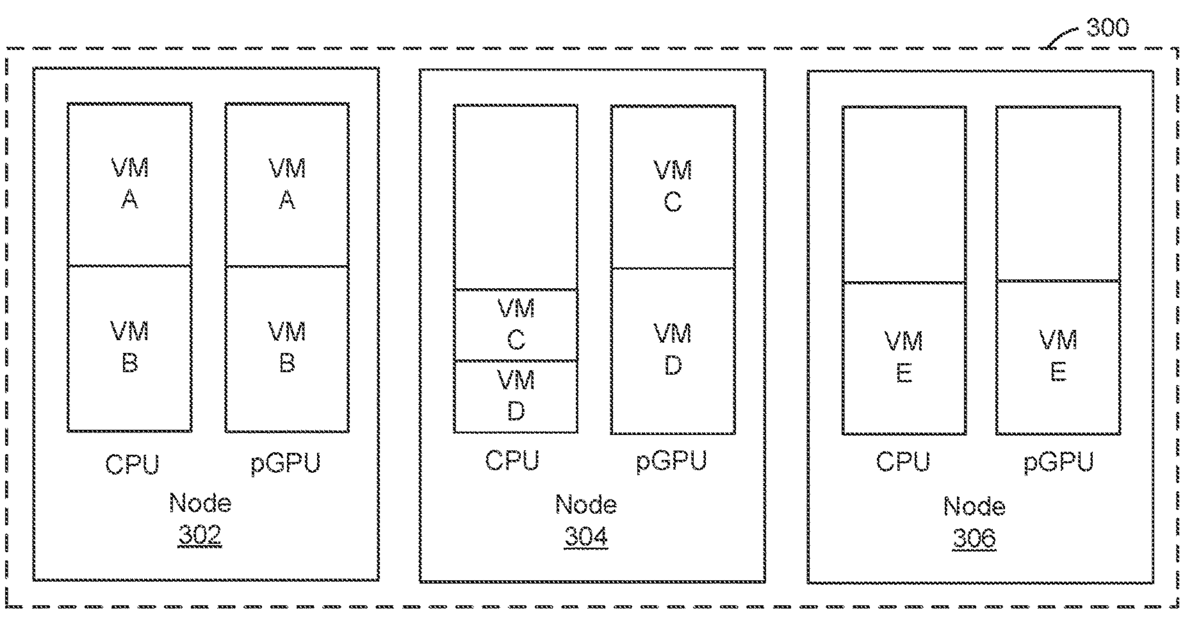
FIGS. 3A-3B illustrate an example of hot spot mitigation to improve performance of a vGPU VM, according to various embodiments.
Figure 3B:
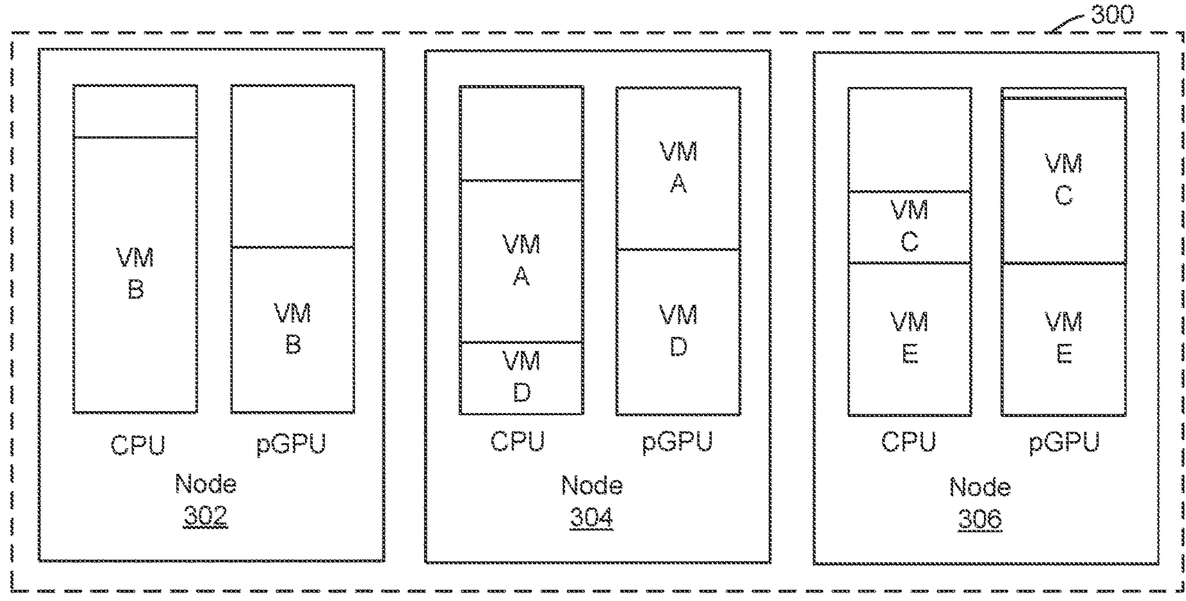

FIGS. 3A-3B illustrate an example of hot spot mitigation to improve performance of a vGPU VM, according to various embodiments. As described, a node in a cluster can become a hot spot when resources such as a pGPU, a CPU, or memory, are under contention by the multiple vGPU VMs running on the node. As shown in FIG. 3A, a cluster 300 includes nodes 302, 304, and 306. VMs A and B run on node 302, VMs C and D run on node 304, and VM E runs on node 306. The placement of VMs A, B, C, D, and E can be made in any technically feasible manner, including statically via the breadth-first search and/or the depth-first search techniques described above in conjunction with FIG. 1 and/or as a result of previous dynamic scheduling. Also shown are the CPU and pGPU resources of nodes 302, 304, and 306 that are consumed by VMs A, B, C, D, and E.

Illustratively, the CPU demands of VMs A and B create a hot spot on node 302, as the CPU of node 302 has no capacity to support additional CPU demands of VMs A or B. If VM A and/or B requires additional CPU capacity to run at peak performance, then VM A and B should not be placed together on node 302. Although the example of FIG. 3 is described with respect to a CPU that is under contention, in other cases, any physical resource(s), such as one or more pGPUs, memory, etc. may be under contention on a node that is a hot spot by being unable to support the requirements of VMs running on the node that utilize the physical resource.

To mitigate the hot spot on node 302, one of VMs A or B should be moved to another node. However, as shown, neither of the nodes 304 or 306 has enough free CPU and pGPU capacity to accept VMs A or B directly.

As shown in FIG. 3B, one solution for mitigating the hot spot on node 302 is to place VM B on node 302, VMs A and D on node 304, and VMs C and E on node 306. As described, in some embodiments, placement solver 104 is responsible for determining a placement, such as the placement shown in panel B, and generating a reconfiguration plan to achieve the placement. For example, a reconfiguration plan to achieve the placement shown in panel B could include migrating VM C from node 304 to node 306, creating enough free CPU and pGPU capacity on node 304 for VM A, and then migrating VM A from node 302 to node 304. The migrations are live migrations in some embodiments. In some embodiments, determining a placement, such as the placement shown in panel B, includes applying one or more of the heuristics and satisfying placement constraints that can be expressed as rules of a mathematical model, as described above in conjunction with FIG. 2. In addition, in some embodiments, generating the reconfiguration plan includes satisfying rules of a mathematical model and identifying a plan that includes a minimum number of VM migrations as well as an order for the migrations, as described above in conjunction with FIG. 2.

Figure 4:
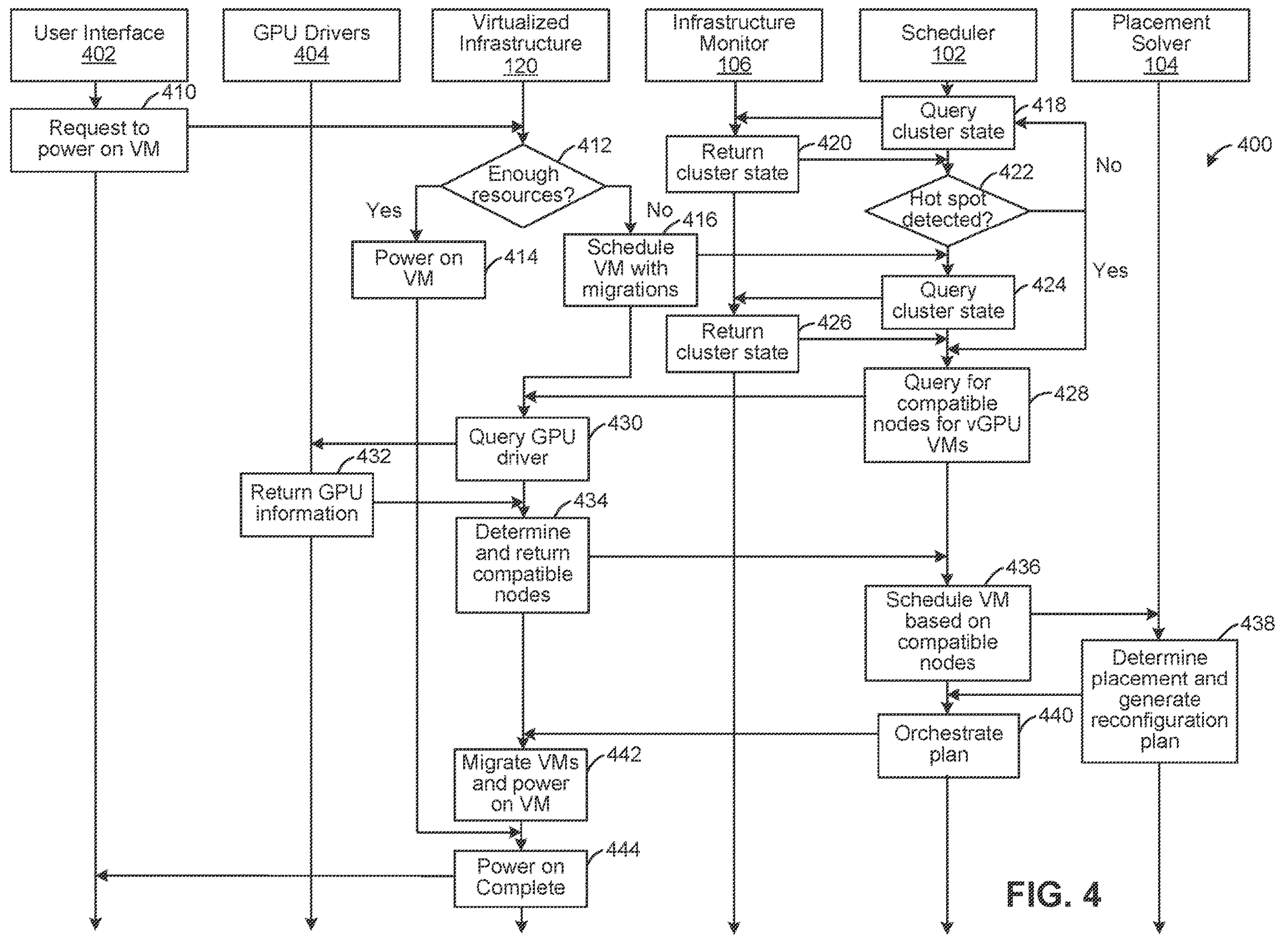
FIG. 4 is a flow diagram of method steps for dynamically load balancing vGPU VMs, according to various embodiments.

FIG. 4 is a flow diagram of method steps for dynamically loading balancing vGPU VMs, according to various embodiments. Although the method steps are described in conjunction with the system of FIG. 1, persons of ordinary skill in the art will understand that any system configured to perform the method steps, in any order, is within the scope of the present disclosure.

As shown, a method 400 begins at a step 410, where a request to power on a VM having a vGPU is received via a user interface 402. In some embodiments, the user interface 402 can include any technically feasible elements (e.g., a button, command line interface, etc.) that enable a user to request to power on the VM. In some embodiments, requests to power on vGPU VMs can be generated automatically in addition to, or in lieu of, requests to power on vGPU VMs from a user interface.

At step 412, virtualized infrastructure 120 determines whether there are enough resources to power on the VM. In some embodiments, virtualized infrastructure 120 can determine whether there are enough resources to power on the VM by comparing the virtual hardware requirements of the VM with available physical resources on nodes within a cluster (e.g., cluster 108). Such a comparison can include comparing the profile of a vGPU included in the VM with profiles of pGPUs included in the nodes to determine whether any pGPU has a profile that is compatible with a profile of the vGPU and sufficient free capacity to support the vGPU, or if there are any pGPUs that have not been assigned to any other vGPUs and can therefore support the vGPU.

If there are enough resources to power on the VM, then method 400 continues to step 414, where virtualized infrastructure 120 powers on the VM. On the other hand, if there are not enough resources to power on the VM, then method 400 proceeds to step 416, where virtualized infrastructure 120 requests that scheduler 102 schedule the VM for powering on, with migrations of VMs required for the VM to be powered on. An example of a cluster that does not include enough resources to power on a VM and scheduling with migrations to overcome the same, which is also referred to herein as cluster defragmentation, are described above in conjunction with FIGS. 2A-2B.

Concurrently, at step 418, scheduler 102 queries the cluster state from infrastructure monitor 106, and infrastructure monitor 106 returns information on the cluster state at step 420. As described, the cluster state information can include metrics indicating node capacities, VM locations and hardware resource usage such as CPU and pGPU usage, etc.

At step 422, scheduler 102 determines, based on the cluster state information returned by infrastructure monitor 106, whether any node is a hot spot. As described, a hot spot can be a node where resources such as a pGPU, a CPU, or memory, are under contention by multiple vGPU VMs. An example hot spot and techniques for mitigating the same are described above in conjunction with FIGS. 3A-3B.

If no hot spot is detected, then method 400 returns to step 418, where scheduler 102 queries the cluster state again. In some embodiments, scheduler 102 periodically queries the cluster state and determines whether any node is a hot spot.

After virtualized infrastructure 120 requests that scheduler 102 schedule the VM for powering on with migrations at step 416, scheduler 102 also queries the cluster state from infrastructure monitor 106 at step 424. Infrastructure monitor 106 then returns information on the cluster state at step 426. Steps 424 and 426 are similar to steps 418 and 420, respectively, that are described above.

If a hot spot is detected at step 422 or after cluster state information is returned by infrastructure monitor 106 at step 426, method 400 continues to step 428, where scheduler 102 queries for compatible nodes for vGPU VMs that are running in the cluster, as indicated by the cluster state information returned by infrastructure monitor 106. As shown, the query request is transmitted to virtualized infrastructure 120.

At step 430, virtualized infrastructure 120 queries GPU drivers 404 in nodes of the cluster, and GPU drivers 404 return information on pGPUs in those nodes at step 432. In some embodiments, the steps of scheduler 102 querying for a compatible node, virtualized infrastructure 120 querying GPU driver 404, and GPU driver 404 returning pGPU information can be repeated for each vGPU VM.

At step 434, virtualized infrastructure 120 determines, based on the information returned by the GPU drivers 404, nodes that are compatible with the vGPU VMs and returns the compatible nodes to scheduler 102. In some embodiments, compatibility is determined by comparing two blobs via a GPU driver, one of which is for a pGPU and the other of which is for a vGPU to run on the pGPU. In such cases, the blob for the pGPU can change when GPU configurations are changed, and the blob for the vGPU can change based on a workload running on the vGPU. Only the GPU driver, and not the scheduler 102, needs to understand the blobs. If the GPU driver returns that the blobs match as part of the GPU information returned at step 432, then the vGPU can be assigned to the pGPU. In such a case, a node that includes the pGPU is determined to be a compatible node for a vGPU VM that includes the vGPU at step 434.

At step 436, scheduler 102 initiates a scheduling of the VM to be powered on based on the compatible nodes returned by virtualized infrastructure 120. Then, at step 438, placement solver 104 determines a placement of VMs and generates a reconfiguration plan. In some embodiments, placement solver 104 determines a placement for VMs on the cluster by applying one or more of the heuristics and satisfying placement constraints that can be expressed as rules of a mathematical model, as described above in conjunction with FIG. 2. As described, the placement constraints can include a capacity constraint that the number of vGPU VMs using a profile on a pGPU does not exceed a capacity of the pGPU, a homogeneity constraint that each pGPU only serves one type of vGPU profile, a constraint that a vGPU VM having a vGPU that is assigned to a pGPU of one node cannot be migrated to another pGPU on the same node, a constraint that each vGPU is assigned to a pGPU, and/or a constraint that different vGPUs associated with a vGPU VM are assigned to different pGPUs. In some embodiments, the placement can be determined using one or more heuristics, such as a branching heuristic that places harder to place VMs first and/or a filtering heuristic that chooses a pGPU for each vGPU based on a cost function.

Further, in some embodiments, placement solver 104 generates the reconfiguration plan for achieving the placement that satisfies rules of a mathematical model and includes a minimum number of VM migrations as well as an order for the migrations, as described above in conjunction with FIG. 2. As described, the reconfiguration plan can include migrating one or more VMs and/or reconfiguring one or more pGPUs to support different vGPU profiles in order to achieve the determined placement. The rules that the reconfiguration plan satisfies can include when a vGPU is reassigned to a pGPU having an initially different profile, all vGPUs already on the pGPU must be migrated to other nodes beforehand, and when a pGPU is not being reassigned to another profile, the number of vGPUs being hosted by the pGPU cannot exceed a defined capacity of the pGPU.

At step 440, scheduler 102 orchestrates the migration and power on plan. Orchestrating the migration and power on plan includes causing virtualized infrastructure 120 to migrate VMs and power on the VM according to the plan at step 442.

At step 444, virtualized infrastructure 120 indicates that powering on of the VM is complete via user interface 402. In some embodiments in which a request to power on the VM is automatically generated rather than being received via user interface 402, virtualized infrastructure 120 can return that powering on of the VM is complete to the software (and/or hardware) component that generated the request to power on the VM.

In sum, techniques are disclosed for dynamically load balancing virtual computing instances having associated virtual computing resources, such as VMs having vGPUs. In the case of vGPU VMs, the dynamic load balancing can be employed to defragment a cluster of nodes hosting vGPU VMs in order to liberate resources and increase hosting capacity and/or to mitigate hotspots by migrating vGPU VMs such that the resources on nodes are not under contention. Defragmenting a cluster can include re-arranging the assignments of the vGPU VMs based on associated vGPU profiles to liberate resources and permit at least one pGPU on a node to be configured with a different pGPU profile that supports a new vGPU VM. Hotspots, in which the resources (CPU, storage-controller, memory, GPU framebuffer, etc.) of a node are under contention, can be mitigated by rearranging the assignments of vGPU VMs such that node resources are no longer under contention. When reassigning vGPU VMs, a new placement of vGPU VMs on nodes in a cluster is computed based on one or more heuristics to satisfy various placement constraints. The placement constraints can include that the vGPUs of a VM must be placed on pGPUs of a node when the VM is placed on that node and/or the vGPUs of a VM must be placed on distinct pGPUs of the node. A reconfiguration plan is generated for migrating the vGPU VMs to the assigned nodes, which can include migrating other VMs away from some nodes and/or reassigning the pGPUs of some nodes with different profiles that support the vGPU VMs being migrated to those nodes. Variations on the disclosed techniques can be used to place VMs and other virtual computing instances (e.g., containers) that are associated with virtual resources other than vGPUs.

At least one technical advantage of the disclosed techniques relative to the prior art is that the disclosed techniques can improve hosting capacity by defragmenting a cluster of nodes. The improved hosting capacity can include the ability to host a vGPU VM or other virtual computing instance associated with a different profile after vGPU VMs or virtual computing instances associated with one profile are consolidated on one or more pGPUs and another pGPU is freed to support the different profile. Another technical advantage of the disclosed techniques relative to the prior art is the disclosed techniques can enable better VM or other virtual computing instance performance by mitigating or eliminating hot spots where resources are under contention on a node. These technical advantages provide one or more technological advancements over prior art approaches.

Exemplary Virtualization System Architectures

According to some embodiments, all or portions of any of the foregoing techniques described with respect to FIGS. 1-4 can be partitioned into one or more modules and instanced within, or as, or in conjunction with a virtualized controller in a virtual computing environment. Some example instances within various virtual computing environments are shown and discussed in further detail in FIGS. 5A-5D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 5A:
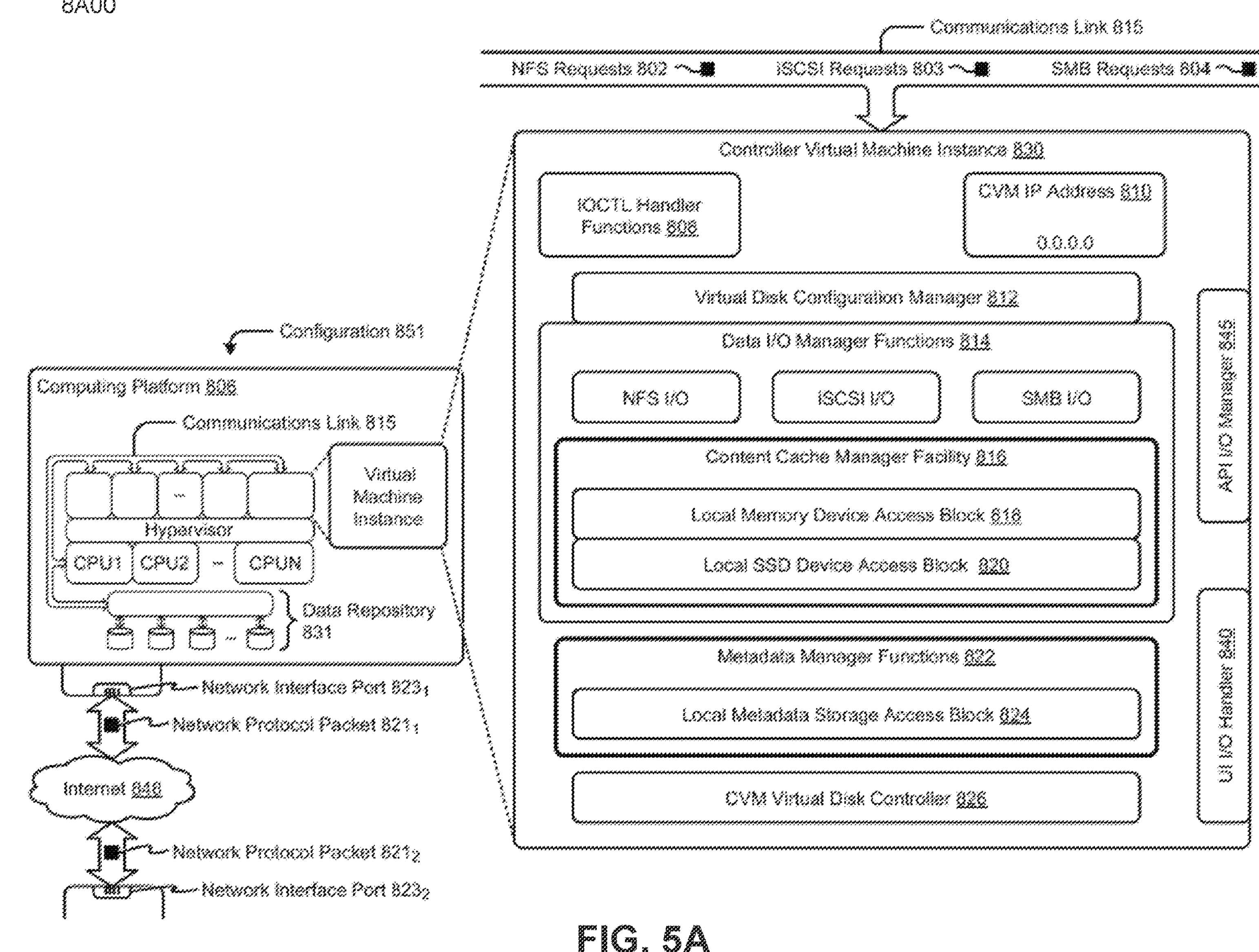
FIGS. 5A-5D are block diagrams illustrating virtualization system architectures configured to implement one or more aspects of the present embodiments.

FIG. 5A is a block diagram illustrating virtualization system architecture 8A00 configured to implement one or more aspects of the present embodiments. As shown in FIG. 5A, virtualization system architecture 8A00 includes a collection of interconnected components, including a controller virtual machine (CVM) instance 830 in a configuration 851. Configuration 851 includes a computing platform 806 that supports virtual machine instances that are deployed as user virtual machines, or controller virtual machines or both. Such virtual machines interface with a hypervisor (as shown). In some examples, virtual machines can include processing of storage I/O (input/output or 10) as received from any or every source within the computing platform. An example implementation of such a virtual machine that processes storage I/O is depicted as CVM instance 830.

In this and other configurations, a CVM instance receives block I/O storage requests as network file system (NFS) requests in the form of NFS requests 802, internet small computer storage interface (iSCSI) block 10 requests in the form of iSCSI requests 803, Samba file system (SMB) requests in the form of SMB requests 804, and/or the like. The CVM instance publishes and responds to an internet protocol (IP) address (e.g., CVM IP address 810). Various forms of input and output can be handled by one or more 10 control handler functions (e.g., IOCTL handler functions 808) that interface to other functions such as data 10 manager functions 814 and/or metadata manager functions 822. As shown, the data 10 manager functions can include communication with virtual disk configuration manager 812 and/or can include direct or indirect communication with any of various block 10 functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry can be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 806 include one or more computer readable media that is capable of providing instructions to a data processor for execution. In some examples, each of the computer readable media can take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM). As shown, controller virtual machine instance 830 includes content cache manager facility 816 that accesses storage locations, possibly including local dynamic random-access memory (DRAM) (e.g., through local memory device access block 818) and/or possibly including accesses to local solid-state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data and can comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance can perform respective portions of sequences of instructions as can be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 can transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions can be processed and/or executed by a CPU as it is received and/or program instructions can be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 5B:
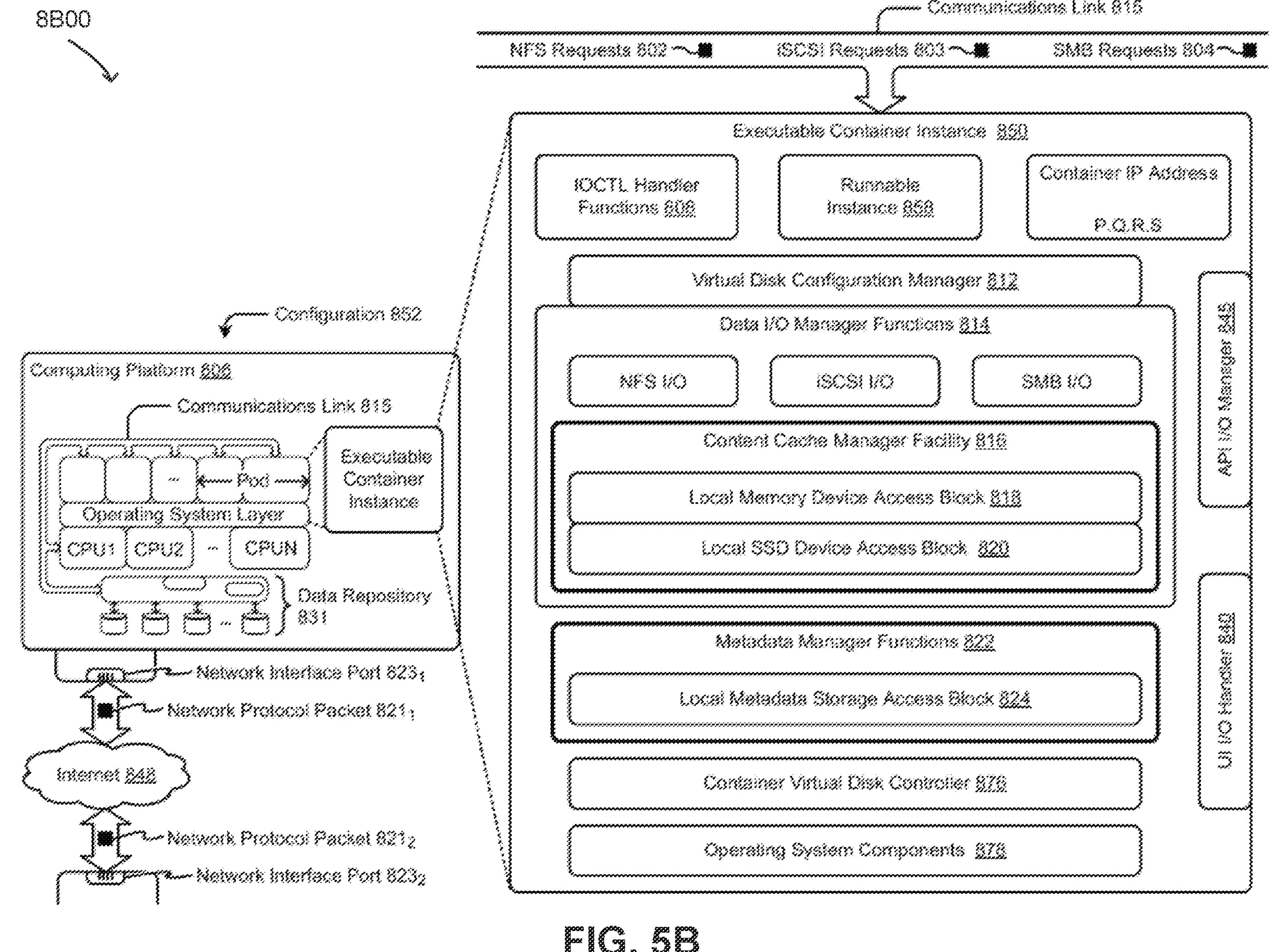

FIG. 5B depicts a block diagram illustrating another virtualization system architecture 8600 configured to implement one or more aspects of the present embodiments. As shown in FIG. 5B, virtualization system architecture 8600 includes a collection of interconnected components, including an executable container instance 850 in a configuration 852. Configuration 852 includes a computing platform 806 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node can communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java® archive repository (JAR) and/or its contents, and/or a script or scripts and/or a directory of scripts, and/or a virtual machine configuration, and can include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "Is" or "Is-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 5C:
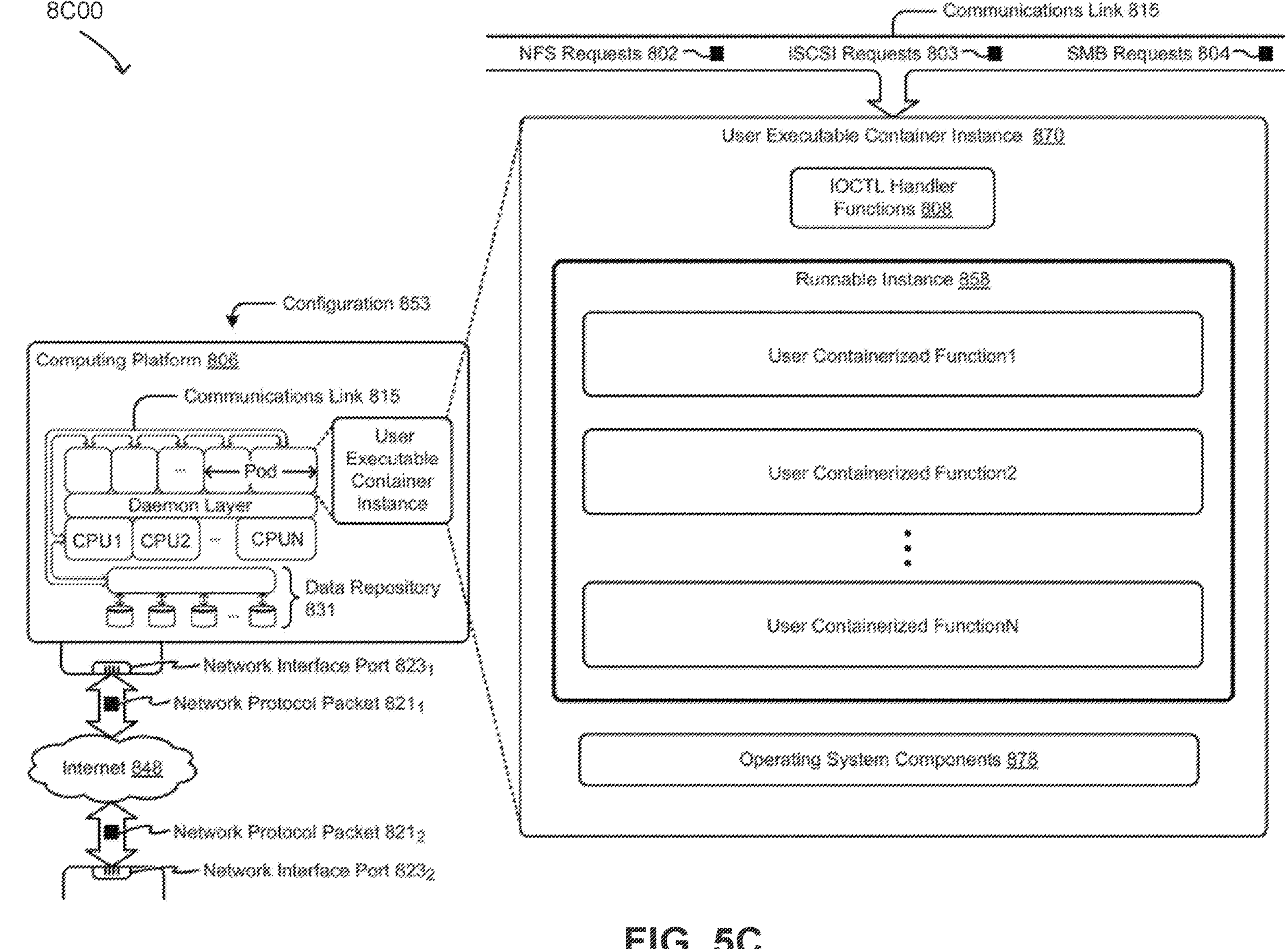

FIG. 5C is a block diagram illustrating virtualization system architecture 8C00 configured to implement one or more aspects of the present embodiments. As shown in FIG. 5C, virtualization system architecture 8C00 includes a collection of interconnected components, including a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In some embodiments of a daemon-assisted containerized architecture, computing platform 806 might or might not host operating system components other than operating system components 878. More specifically, the shown daemon might or might not host operating system components other than operating system components 878 of user executable container instance 870.

In some embodiments, the virtualization system architecture 8A00, 8600, and/or 8C00 can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage can include storage that is accessible over communications link 815. Such network accessible storage can include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 851) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 5D:
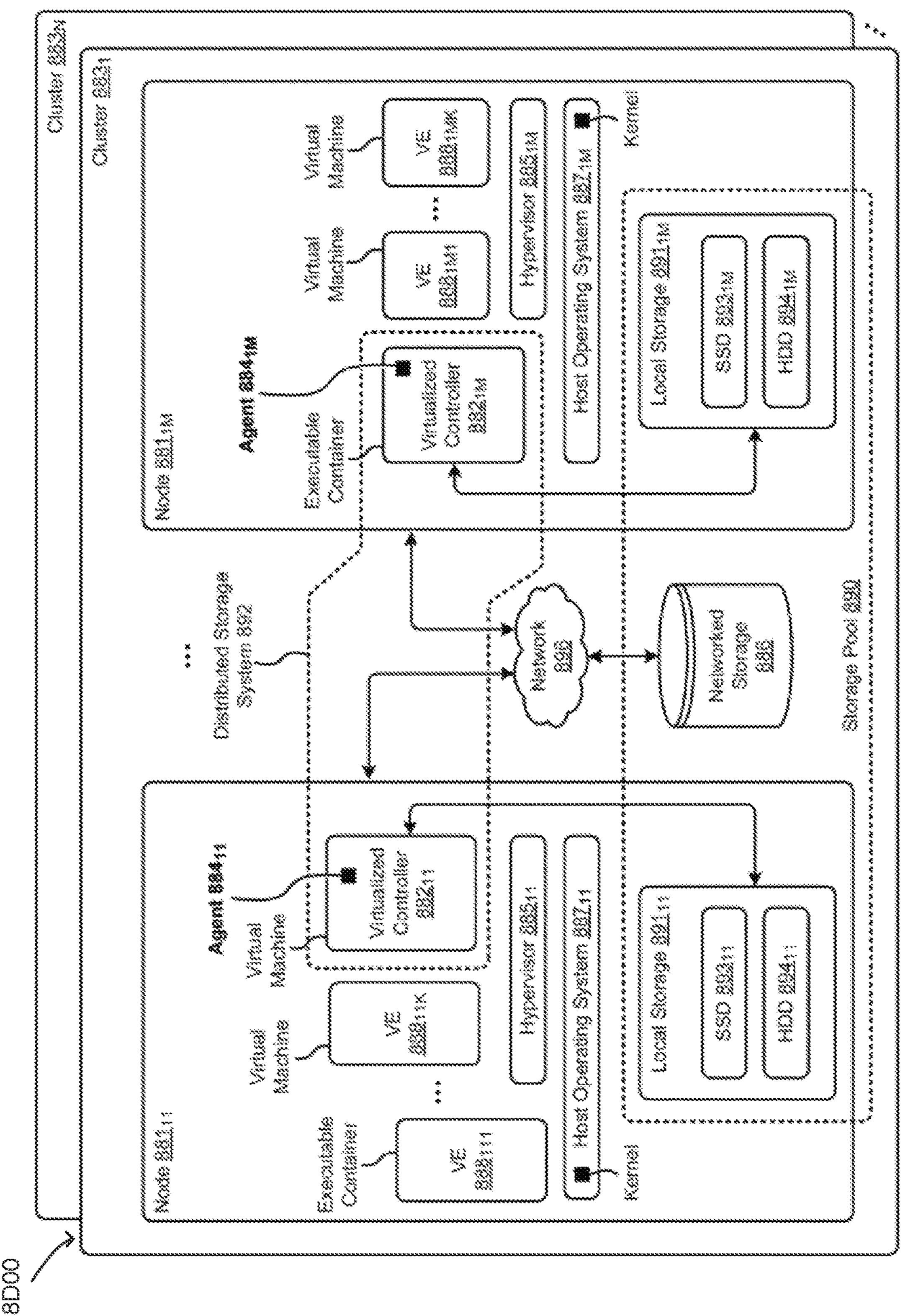

FIG. 5D is a block diagram illustrating virtualization system architecture 8D00 configured to implement one or more aspects of the present embodiments. As shown in FIG. 5D, virtualization system architecture 8D00 includes a distributed virtualization system that includes multiple clusters (e.g., cluster 8831, . . . , cluster 883N) comprising multiple nodes that have multiple tiers of storage in a storage pool. Representative nodes (e.g., node 88111, . . . , node 8811M) and storage pool 890 associated with cluster 8831 are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage 89111, . . . , local storage 8911M). For example, the local storage can be within or directly attached to a server and/or appliance associated with the nodes. Such local storage can include solid state drives (SSD 89311, . . . , SSD 8931M), hard disk drives (HDD 89411, . . . , HDD 8941M), and/or other storage devices.

As shown, any of the nodes of the distributed virtualization system can implement one or more user virtualized entities (e.g., VE 888111, . . . , VE 88811K, . . . , VE 8881M1, VE 8881MK), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system 88711, . . . , host operating system 8871M), while the VMs run multiple applications on various respective guest operating systems. Such flexibility can be facilitated at least in part by a hypervisor (e.g., hypervisor 88511, . . . , hypervisor 8851M), which hypervisor is logically located between the various guest operating systems of the VMs and the host operating system of the physical infrastructure (e.g., node).

As an alternative, executable containers can be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system 88711, . . . , host operating system 8871M) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node 88111 can interface with a controller virtual machine (e.g., virtualized controller 88211) through hypervisor 88511 to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller 8821M) in an operating system virtualization environment at a given node. In this case, for example, the virtualized entities at node 8811M can access the storage pool 890 by interfacing with a controller container (e.g., virtualized controller 8821M) through hypervisor 8851M and/or the kernel of host operating system 8871M.

In some embodiments, one or more instances of an agent can be implemented in the distributed storage system 892 to facilitate the herein disclosed techniques. Specifically, agent 88411 can be implemented in the virtualized controller 88211, and agent 8841M can be implemented in the virtualized controller 8821M. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 6:
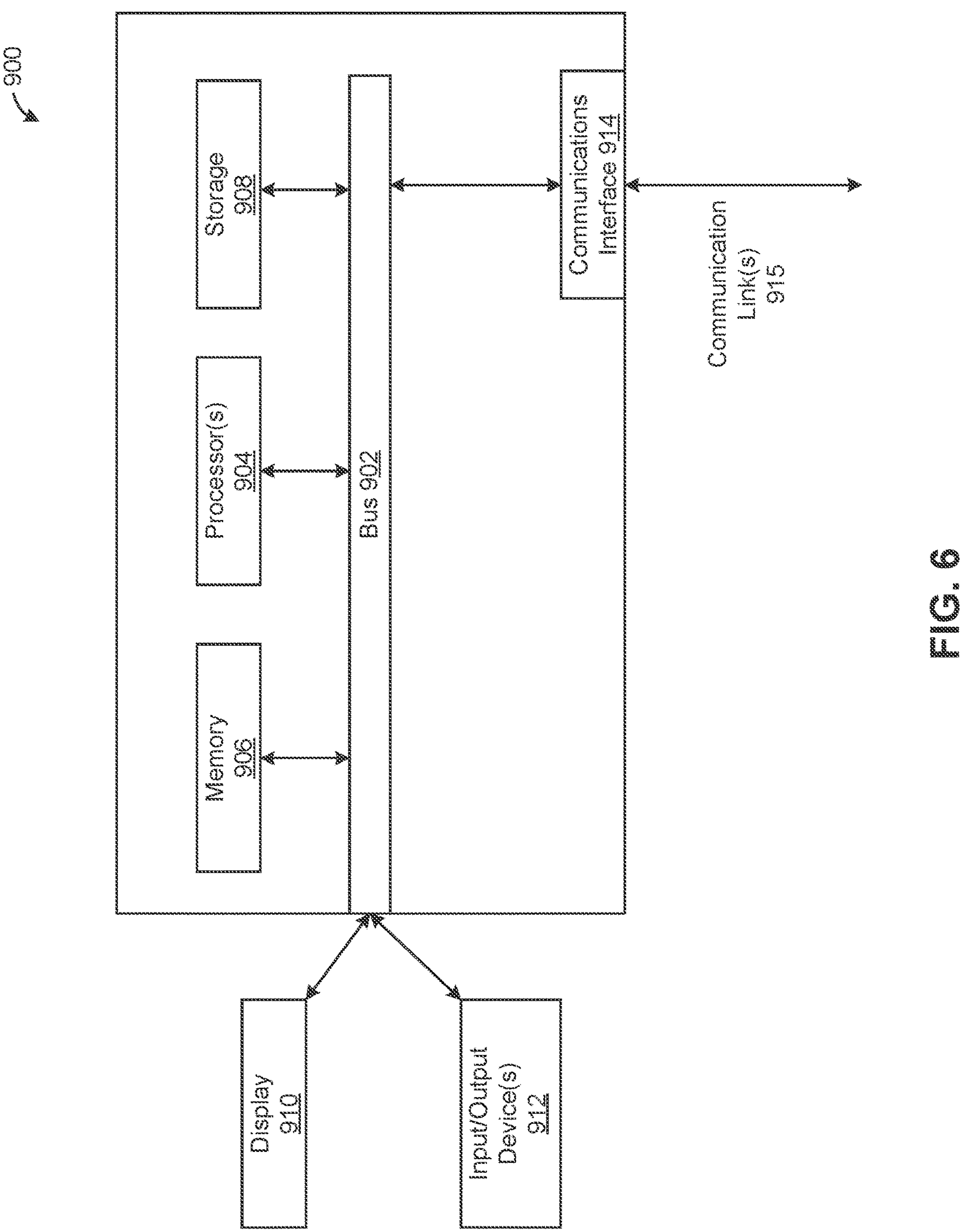
FIG. 6 is a block diagram illustrating a computer system configured to implement one or more aspects of the present embodiments.

FIG. 6 is a block diagram illustrating a computer system 900 configured to implement one or more aspects of the present embodiments. In some embodiments, computer system 900 may be representative of a computer system for implementing one or more aspects of the embodiments disclosed in FIGS. 1-4. In some embodiments, computer system 900 is a server machine operating in a data center or a cloud computing environment suitable for implementing an embodiment of the present invention. As shown, computer system 900 includes a bus 902 or other communication mechanism for communicating information, which interconnects subsystems and devices, such as one or more processors 904, memory 906, storage 908, optional display 910, one or more input/output devices 912, and a communications interface 914. Computer system 900 described herein is illustrative and any other technically feasible configurations fall within the scope of the present disclosure.

The one or more processors 904 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 904 can be any technically feasible hardware unit capable of processing data and/or executing software applications. Further, in the context of this disclosure, the computing elements shown in computer system 900 can correspond to a physical computing system (e.g., a system in a data center) or can be a virtual computing instance, such as any of the virtual machines described in FIGS. 5A-5D.

Memory 906 includes a random-access memory (RAM) module, a flash memory unit, and/or any other type of memory unit or combination thereof. The one or more processors 904, and/or communications interface 914 are configured to read data from and write data to memory 906. Memory 906 includes various software programs that include one or more instructions that can be executed by the one or more processors 904 and application data associated with said software programs.

Storage 908 includes non-volatile storage for applications and data, and can include one or more fixed or removable disk drives, HDDs, SSD, NVMes, vDisks, flash memory devices, and/or other magnetic, optical, and/or solid-state storage devices.

Communications interface 914 includes hardware and/or software for coupling computer system 900 to one or more communication links 915. The one or more communication links 915 can include any technically feasible type of communications network that allows data to be exchanged between computer system 900 and external entities or devices, such as a web server or another networked computing system. For example, the one or more communication links 915 can include one or more wide area networks (WANs), one or more local area networks (LANs), one or more wireless (WiFi) networks, the Internet, and/or the like.

1. In some embodiments, one or more non-transitory computer-readable media store program instructions that, when executed by one or more processors, cause the one or more processors to perform steps of determining at least one physical resource of a node in a cluster of nodes is under contention by virtual computing instances or a new virtual computing instance cannot be placed on any node in the cluster of nodes, determining a placement for one or more virtual computing instances on the cluster of nodes, each virtual computing instance having a virtual resource associated with a profile that is compatible with a profile associated with a physical resource of a node on which the virtual computing instance is placed, and generating and executing a plan to achieve the placement, wherein the plan includes at least one of migrating at least one virtual computing instance or reconfiguring a profile associated with at least one physical resource.

2. The one or more non-transitory computer-readable media of clause 1, wherein a first virtual resource of a first virtual computing instance is a virtual graphics processing unit, and a first physical resource of a first node on which the first virtual computing instance is placed is a physical graphics processing unit.

3. The one or more non-transitory computer-readable media of clauses 1 or 2, wherein, when at least one physical resource of a first node in the cluster of nodes is under contention, the placement comprises placing a first virtual computing instance that is executing on the first node onto a second node.

4. The one or more non-transitory computer-readable media of any of clauses 1-3, wherein the plan comprises consolidating a plurality of virtual computing instances on one or more nodes to free a first physical resource of a first node, and reconfiguring the first physical resource from a first profile to a second profile.

5. The one or more non-transitory computer-readable media of any of clauses 1-4, wherein the placement is determined based on one or more placement constraints that include at least one of a constraint that each virtual resource of the one or more virtual computing instances is assigned to a corresponding physical resource, a constraint that different virtual resources of a virtual computing instance are assigned to different physical resources, a constraint that a number of virtual computing instances having virtual resources associated with a profile that are assigned to each physical resource does not exceed a capacity of the physical resource, a constraint that each physical resource is associated with at most one profile, or a constraint that a virtual computing instance having a virtual resource that is assigned to a physical resource of a node cannot be migrated to a same node.

6. The one or more non-transitory computer-readable media of any of clauses 1-5, wherein the placement is determined based on at least one of a cost function or a heuristic that places more difficult to place virtual computing instances before less difficult to place virtual computing instances.

7. The one or more non-transitory computer-readable media of any of clauses 1-6, wherein the plan is generated to satisfy at least one of a rule that virtual resources assigned to each physical resource do not exceed a capacity of the physical resource or a rule that, prior to assigning a virtual resource to a physical resource associated with a profile that must be reconfigured to support the virtual resource, all virtual computing instances having virtual resources assigned to the physical resource are migrated to other nodes.

8. The one or more non-transitory computer-readable media of any of clauses 1-7, wherein the plan is generated to include a minimum number of migrations of virtual computing instances.

9. The one or more non-transitory computer-readable media of any of clauses 1-8, wherein the one or more virtual computing instances comprise at least one virtual machine or container.

10. The one or more non-transitory computer-readable media of any of clauses 1-9, wherein the cluster of nodes is included in a public cloud computing system, a private cloud computing system, or a hybrid cloud computing system.

11. In some embodiments, a computer-implemented method for scheduling one or more virtual computing instances comprises determining at least one physical resource of a node in a cluster of nodes is under contention by virtual computing instances or a new virtual computing instance cannot be placed on any node in the cluster of nodes, determining a placement for one or more virtual computing instances on the cluster of nodes, each virtual computing instance having a virtual resource associated with a profile that is compatible with a profile associated with a physical resource of a node on which the virtual computing instance is placed, and generating and executing a plan to achieve the placement, wherein the plan includes at least one of migrating at least one virtual computing instance or reconfiguring a profile associated with at least one physical resource.

12. The computer-implemented method of clause 11, wherein a first virtual resource of a first virtual computing instance is a virtual graphics processing unit, and a first physical resource of a first node on which the first virtual computing instance is placed is a physical graphics processing unit.

13. The computer-implemented method of clauses 11 or 12, wherein, when at least one physical resource of a first node in the cluster of nodes is under contention, the placement comprises placing a first virtual computing instance that is executing on the first node onto a second node.

14.The computer-implemented method of any of clauses 11-13, wherein the plan comprises consolidating a plurality of virtual computing instances on one or more nodes to free a first physical resource of a first node, and reconfiguring the first physical resource from a first profile to a second profile.

15.The computer-implemented method of any of clauses 11-14, wherein the placement is determined based on one or more placement constraints that include at least one of a constraint that each virtual resource of the one or more virtual computing instances is assigned to a corresponding physical resource, a constraint that different virtual resources of a virtual computing instance are assigned to different physical resources, a constraint that a number of virtual computing instances having virtual resources associated with a profile that are assigned to each physical resource does not exceed a capacity of the physical resource, a constraint that each physical resource is associated with at most one profile, or a constraint that a virtual computing instance having a virtual resource that is assigned to a physical resource of a node cannot be migrated to a same node.

16. The computer-implemented method of any of clauses 11-15, wherein the placement is determined based on at least one of a cost function or a heuristic that places more difficult to place virtual computing instances before less difficult to place virtual computing instances.

17. The computer-implemented method of any of clauses 11-16, wherein the plan is generated to satisfy at least one of a rule that virtual resources assigned to each physical resource do not exceed a capacity of the physical resource or a rule that, prior to assigning a virtual resource to a physical resource associated with a profile that must be reconfigured to support the virtual resource, all virtual computing instances having virtual resources assigned to the physical resource are migrated to other nodes.

18. The computer-implemented method of any of clauses 11-17, wherein the plan is generated to include a minimum number of migrations of virtual computing instances.

19. The computer-implemented method of any of clauses 11-18, wherein the one or more virtual computing instances comprise at least one virtual machine or container.

20. The computer-implemented method of any of clauses 11-19, wherein the cluster of nodes is included in a public cloud computing system, a private cloud computing system, or a hybrid cloud computing system.

21. In some embodiments, a system comprises one or more memories that include instructions, and one or more processors that are coupled to one or more memories and, when executing the instructions determines at least one physical resource of a node in a cluster of nodes is under contention by virtual computing instances or a virtual computing instance cannot be placed on any node in the cluster of nodes, determines a placement for one or more virtual computing instances on the cluster of nodes, each virtual computing instance having a virtual resource associated with a profile that is compatible with a profile associated with a physical resource of a node on which the virtual computing instance is placed, and generates and executes a plan to achieve the placement, wherein the plan includes at least one of migrating at least one virtual computing instance or reconfiguring a profile associated with at least one physical resource.

22. The system of clause 21, wherein a first virtual resource of a first virtual computing instance is a virtual graphics processing unit, and a first physical resource of a first node on which the first virtual computing instance is placed is a physical graphics processing unit.

23. The system of clauses 21 or 22, wherein, when at least one physical resource of a first node in the cluster of nodes is under contention, the placement comprises placing a first virtual computing instance that is executing on the first node onto a second node.

24. The system of any of clauses 21-23, wherein the plan comprises consolidating a plurality of virtual computing instances on one or more nodes to free a first physical resource of a first node, and reconfiguring the first physical resource from a first profile to a second profile.

25. The system of any of clauses 21-24, wherein the placement is determined based on one or more placement constraints that include at least one of a constraint that each virtual resource of the one or more virtual computing instances is assigned to a corresponding physical resource, a constraint that different virtual resources of a virtual computing instance are assigned to different physical resources, a constraint that a number of virtual computing instances having virtual resources associated with a profile that are assigned to each physical resource does not exceed a capacity of the physical resource, a constraint that each physical resource is associated with at most one profile, or a constraint that a virtual computing instance having a virtual resource that is assigned to a physical resource of a node cannot be migrated to a same node.

26. The system of any of clauses 21-25, wherein the placement is determined based on at least one of a cost function or a heuristic that places more difficult to place virtual computing instances before less difficult to place virtual computing instances.

27. The system of any of clauses 21-26, wherein the plan is generated to satisfy at least one of a rule that virtual resources assigned to each physical resource do not exceed a capacity of the physical resource or a rule that, prior to assigning a virtual resource to a physical resource associated with a profile that must be reconfigured to support the virtual resource, all virtual computing instances having virtual resources assigned to the physical resource are migrated to other nodes.

28. The system of any of clauses 21-27, wherein the plan is generated to include a minimum number of migrations of virtual computing instances Any and all combinations of any of the claim elements recited in any of the claims and/or any elements described in this application, in any fashion, fall within the contemplated scope of the present invention and protection.

29. The system of any of clauses 21-28, wherein the one or more virtual computing instances comprise at least one virtual machine or container.

30. The system of any of clauses 21-29, wherein the cluster of nodes is included in a public cloud computing system, a private cloud computing system, or a hybrid cloud computing system.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method, or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:

determining a new placement for one or more virtual computing instances on a cluster of nodes is required;

determining the new placement for the one or more virtual computing instances on the cluster of nodes, each virtual computing instance having a virtual resource associated with a physical graphics processing unit (pGPU) of a node on which the virtual computing instance is placed, wherein a profile associated with the pGPU is selected from a predefined set of profiles that the pGPU is reconfigurable with to support different profiles associated with virtual resources included in virtual computing instances; and generating and executing a plan to achieve the new placement, wherein generating and executing the plan comprises:

determining or selecting the plan based on at least one of: the plan including a minimum number of virtual computing instance migrations, or the plan including a minimum amount of migrated memory for the virtual computing instance migrations;

migrating at least one virtual computing instance away from at least one pGPU to enable a reconfiguration of the pGPU specified in the plan;

reconfiguring a profile for the at least one pGPU after migrating the at least one virtual computing instance; and executing the one or more virtual computing instances using the at least one pGPU to complete the new placement.

2. The one or more non-transitory computer-readable media of claim 1, wherein a first virtual resource of a first virtual computing instance is a virtual graphics processing unit, and a first physical resource of a first node on which the first virtual computing instance is placed is a pGPU.

3. The one or more non-transitory computer-readable media of claim 1, wherein, when at least one pGPU of a first node in the cluster of nodes is under contention, the new placement comprises placing a first virtual computing instance that is executing on the first node onto a second node.

4. The one or more non-transitory computer-readable media of claim 1, wherein the at least one pGPU includes a first pGPU of a first node, and wherein migrating the at least one virtual computing instance comprises consolidating a plurality of virtual computing instances on one or more nodes to free the first pGPU.

5. The one or more non-transitory computer-readable media of claim 1, wherein the new placement is determined based on one or more placement constraints that include at least one of a constraint that different virtual resources of a virtual computing instance are assigned to different pGPUs, a constraint that a number of virtual computing instances having virtual resources associated with respective profiles that are assigned to each pGPU does not exceed a capacity of the pGPU, a constraint that each pGPU is associated with at most one profile, or a constraint that a virtual computing instance having a virtual resource that is assigned to a pGPU of a node cannot be migrated to a same node.

6. The one or more non-transitory computer-readable media of claim 1, wherein the new placement is determined based on at least one of a cost function or a heuristic that first places virtual computing instances having at least one of a greatest number of a first type of virtual resource or a greatest size of one or more virtual resources.

7. The one or more non-transitory computer-readable media of claim 1, wherein the plan is generated to satisfy at least one of a rule that virtual resources assigned to each pGPU do not exceed a capacity of pGPU or a rule that, prior to assigning a virtual resource to a pGPU associated with a profile that must be reconfigured to support the virtual resource, all virtual computing instances having virtual resources assigned to the pGPU are migrated to other nodes.

8. The one or more non-transitory computer-readable media of claim 1, wherein the plan is generated to include a minimum number of migrations of virtual computing instances.

9. The one or more non-transitory computer-readable media of claim 1, wherein the one or more virtual computing instances comprise at least one virtual machine or container.

10. The one or more non-transitory computer-readable media of claim 1, wherein the cluster of nodes is included in a public cloud computing system, a private cloud computing system, or a hybrid cloud computing system.

11. The one or more non-transitory computer-readable media of claim 1, wherein determining the new placement for the one or more virtual computing instances on the cluster of nodes is required comprises determining at least one pGPU of a node in the cluster of nodes is under contention by a set of virtual computing instances executing on the node.

12. The one or more non-transitory computer-readable media of claim 1, wherein determining the new placement for the one or more virtual computing instances on the cluster of nodes is required comprises determining a new virtual computing instance cannot be placed on any node in the cluster of nodes.

13. The one or more non-transitory computer-readable media of claim 1, wherein the new placement is determined based on a cost, and wherein the steps further include computing the cost based on a number of the at least one virtual computing instance that is migrated.

14. The one or more non-transitory computer-readable media of claim 1, wherein the plan further includes an ordering for migrating one or more virtual computing instances that causes one or more capacity constraints associated with one or more pGPUs to be satisfied continuously.

15. A computer-implemented method for scheduling one or more virtual computing instances, the method comprising:

determining a new placement for one or more virtual computing instances on a cluster of nodes is required;

determining the new placement for the one or more virtual computing instances on the cluster of nodes, each virtual computing instance having a virtual resource associated with a physical graphics processing unit (pGPU) of a node on which the virtual computing instance is placed, wherein a profile associated with the pGPU is selected from a predefined set of profiles that the pGPU is reconfigurable with to support different profiles associated with virtual resources included in virtual computing instances; and generating and executing a plan to achieve the new placement, wherein generating and executing the plan comprises:

determining or selecting the plan based on at least one of: the plan including a minimum number of virtual computing instance migrations, or the plan including a minimum amount of migrated memory for the virtual computing instance migrations;

migrating at least one virtual computing instance away from at least one pGPU to enable a reconfiguration of the pGPU specified in the plan;

reconfiguring a profile for the at least one pGPU after migrating the at least one virtual computing instance; and executing the one or more virtual computing instances using the at least one pGPU to complete the new placement.

16. The computer-implemented method of claim 15, wherein a first virtual resource of a first virtual computing instance is a virtual graphics processing unit, and a first physical resource of a first node on which the first virtual computing instance is placed is a pGPU.

17. The computer-implemented method of claim 15, wherein, when at least one pGPU of a first node in the cluster of nodes is under contention, the new placement comprises placing a first virtual computing instance that is executing on the first node onto a second node.

18. The computer-implemented method of claim 15, The one or more non-transitory computer-readable media of claim 1, wherein the at least one pGPU includes a first pGPU of a first node, and wherein migrating the at least one virtual computing instance comprises consolidating a plurality of virtual computing instances on one or more nodes to free the first pGPU.

19. The computer-implemented method of claim 15, wherein the new placement is determined based on one or more placement constraints that include at least one of a constraint that different virtual resources of a virtual computing instance are assigned to different pGPUs, a constraint that a number of virtual computing instances having virtual resources associated with respective profiles that are assigned to each pGPU does not exceed a capacity of the pGPU, a constraint that each pGPU is associated with at most one profile, or a constraint that a virtual computing instance having a virtual resource that is assigned to a pGPU of a node cannot be migrated to a same node.

20. The computer-implemented method of claim 15, wherein the new placement is determined based on at least one of a cost function or a heuristic that first places virtual computing instances having at least one of a greatest number of a first type of virtual resource or a greatest size of one or more virtual resources.

21. The computer-implemented method of claim 15, wherein the plan is generated to satisfy at least one of a rule that virtual resources assigned to each pGPU do not exceed a capacity of the pGPU or a rule that, prior to assigning a virtual resource to a pGPU associated with a profile that must be reconfigured to support the virtual resource, all virtual computing instances having virtual resources assigned to the pGPU are migrated to other nodes.

22. The computer-implemented method of claim 15, wherein the plan is generated to include a minimum number of migrations of virtual computing instances.

23. The computer-implemented method of claim 15, wherein determining the new placement for the one or more virtual computing instances on the cluster of nodes is required comprises determining at least one pGPU of a node in the cluster of nodes is under contention by a set of virtual computing instances executing on the node.

24. The computer-implemented method of claim 15, wherein determining the new placement for the one or more virtual computing instances on the cluster of nodes is required comprises determining a new virtual computing instance cannot be placed on any node in the cluster of nodes.

25. The computer-implemented method of claim 15, wherein the new placement is determined based on a cost, and wherein the method further comprises computing the cost based on a number of the at least one virtual computing instance that is migrated.

26. The computer-implemented method of claim 15, wherein the plan further includes an ordering for migrating one or more virtual computing instances that causes one or more capacity constraints associated with one or more pGPUs to be satisfied continuously.

27. A system, comprising:

one or more memories that include instructions; and one or more processors that are coupled to the one or more memories and, when executing the instructions:

determine a new placement for one or more virtual computing instances on a cluster of nodes is required, determine the new placement for the one or more virtual computing instances on the cluster of nodes, each virtual computing instance having a virtual resource associated with a physical graphics processing unit (pGPU) of a node on which the virtual computing instance is placed, wherein a profile associated with the pGPU is selected from a predefined set of profiles that the pGPU is reconfigurable with to support different profiles associated with virtual resources included in virtual computing instances, and generating and executing a plan to achieve the new placement, wherein generating and executing the plan comprises:

determining or selecting the plan based on at least one of: the plan including a minimum number of virtual computing instance migrations, or the plan including a minimum amount of migrated memory for the virtual computing instance migrations;

migrating at least one virtual computing instance away from at least one pGPU to enable a reconfiguration of the pGPU specified in the plan;

reconfiguring a profile for the at least one pGPU after migrating the at least one virtual computing instance; and executing the one or more virtual computing instances using the at least one pGPU to complete the new placement.

28. The system of claim 27, wherein a first virtual resource of a first virtual computing instance is a virtual graphics processing unit, and a first physical resource of a first node on which the first virtual computing instance is placed is a pGPU.

29. The system of claim 27, wherein, when at least one pGPU of a first node in the cluster of nodes is under contention, the new placement comprises placing a first virtual computing instance that is executing on the first node onto a second node.

30. The system of claim 27, wherein the at least one pGPU includes a first pGPU of a first node, and wherein migrating the at least one virtual computing instance comprises consolidating a plurality of virtual computing instances on one or more nodes to free the first pGPU.

31. The system of claim 27, wherein the new placement is determined based on one or more placement constraints that include at least one of a a constraint that different virtual resources of a virtual computing instance are assigned to different pGPUs, a constraint that a number of virtual computing instances having virtual resources associated with respective profiles that are assigned to each pGPU does not exceed a capacity of the pGPU, a constraint that each pGPU is associated with at most one profile, or a constraint that a virtual computing instance having a virtual resource that is assigned to a pGPU of a node cannot be migrated to a same node.

32. The system of claim 27, wherein the new placement is determined based on at least one of a cost function or a heuristic that first places virtual computing instances having at least one of a greatest number of a first type of virtual resource or a greatest size of one or more virtual resources.

33. The system of claim 27, wherein the plan is generated to satisfy at least one of a rule that virtual resources assigned to each pGPU do not exceed a capacity of the pGPU or a rule that, prior to assigning a virtual resource to a pGPU associated with a profile that must be reconfigured to support the virtual resource, all virtual computing instances having virtual resources assigned to the pGPU are migrated to other nodes.

34. The system of claim 27, wherein the plan is generated to include a minimum number of migrations of virtual computing instances.

35. The system of claim 27, wherein determining the new placement for the one or more virtual computing instances on the cluster of nodes is required comprises determining at least one pGPU of a node in the cluster of nodes is under contention by a set of virtual computing instances executing on the node.

36. The system of claim 27, wherein determining the new placement for the one or more virtual computing instances on the cluster of nodes is required comprises determining a new virtual computing instance cannot be placed on any node in the cluster of nodes.

37. The system of claim 27, wherein the new placement is determined based on a cost, and wherein method further comprises computing the cost based on a number of the at least one virtual computing instance that is migrated.

38. The system of claim 27, wherein the plan further includes an ordering for migrating one or more virtual computing instances that causes one or more capacity constraints associated with one or more pGPUs to be satisfied continuously.

* * * * *